(12) United States Patent
Inada et al.

(10) Patent No.: US 7,235,622 B2
(45) Date of Patent: Jun. 26, 2007

(54) POLYETHYLENE TEREPHTHALATE FOR MOLDING AND PRODUCTION THE SAME

(75) Inventors: Shuji Inada, Minato-ku (JP); Kikuchi Sato, Fukuyama (JP)

(73) Assignee: Pet Rebirth Co., Ltd., Kawasaki-Shi (JP)

( * ) Notice: Subject to any disclaimer, the term of this patent is extended or adjusted under 35 U.S.C. 154(b) by 0 days.

(21) Appl. No.: 10/550,916

(22) PCT Filed: Sep. 30, 2004

(86) PCT No.: PCT/JP2004/014777

§ 371 (c)(1),
(2), (4) Date: Sep. 28, 2005

(87) PCT Pub. No.: WO2005/035621

PCT Pub. Date: Apr. 21, 2005

(65) Prior Publication Data

US 2006/0135739 A1    Jun. 22, 2006

(30) Foreign Application Priority Data

Oct. 8, 2003   (JP)   ............................. 2003-349665

(51) Int. Cl.
    *C08G 63/00*   (2006.01)
(52) U.S. Cl. ...................... 528/272; 525/437; 528/271; 528/308.6; 528/502; 528/503
(58) Field of Classification Search ................ 528/272, 528/308, 308.6, 502, 503, 271; 525/437
    See application file for complete search history.

(56) References Cited

U.S. PATENT DOCUMENTS 6,703,474 B2 * 3/2004 Fujimori et al. ............ 528/275

FOREIGN PATENT DOCUMENTS

| JP | 03-047830 | 2/1991 |
| JP | 05-255491 | 10/1993 |
| JP | 06-234834 | 8/1994 |
| JP | 08-231689 | 9/1996 |
| JP | 2002-047340 | 2/2002 |
| JP | 2002-121173 | 4/2002 |
| WO | 01/10812 A1 | 2/2001 |
| WO | 02/10117 A1 | 2/2002 |

* cited by examiner

*Primary Examiner*—Terressa Boykin
(74) *Attorney, Agent, or Firm*—Wenderoth, Lind & Ponack, L.L.P.

(57) ABSTRACT

There is provided a method for producing a polyethylene terephthalate for molding which has a low content of cyclic trimer. The present invention is a method for producing a polyethylene terephthalate for molding which comprises (1) a condensation step of condensing bis(2-hydroxyethyl) terephthalate having an ion content of 10 ppm or less and an acid value of 30 mgKOH/g or less to produce an oligomer having an average polymerization degree of 4 to 10, (2) a melt-polymerization step of melt-polymerizing the oligomer to produce a prepolymer having an intrinsic viscosity of 0.50 to 0.65, and (3) a solid-state polymerization step of crystallizing pellets of the prepolymer and then solid-state polymerizing the prepolymer at a temperature of 190 to 230° C. to produce a polyethylene terephthalate having an intrinsic viscosity of not lower than 0.65; and a polyethylene terephthalate for molding which is obtained by the method and has specific properties.

12 Claims, No Drawings

POLYETHYLENE TEREPHTHALATE FOR MOLDING AND PRODUCTION THE SAME

TECHNICAL FIELD

The present invention relates to a production method of a polyethylene terephthalate for molding. More specifically, it relates to a production method of a polyethylene terephthalate for molding which uses bis(2-hydroxyethyl)terephthalate as a starting material and has a low content of cyclic trimer. Further, the present invention also relates to a polyethylene terephthalate for molding.

BACKGROUND ART

A polyethylene terephthalate (hereinafter may be abbreviated as "PET") is mass-produced and used as a material in a wide variety of applications such as fibers, films (including sheets), containers and electric components, due to its excellent physical properties and chemical properties. Particularly, demand for PET bottles has been rapidly increasing.

Properties required for PET differ according to applications. For example, a PET for bottles is required to be a polymer having a higher polymerization degree than those for fibers for clothing and for films (including sheets) and to have low contents of cyclic trimer and aldehyde, from the viewpoints of bottle properties (such as transparency, toughness and flavor), moldability and other properties.

The PET for bottles is generally produced by subjecting terephthalic acid and ethylene glycol to an esterification reaction and then to melt-polymerization so as to produce a prepolymer and subjecting the prepolymer to solid-state polymerization. The solid-state polymerization is effective in achieving the above high polymerization degree and low contents of cyclic trimer and aldehyde. However, since these properties generally deteriorate during the melt molding process, the above solid-state polymerization effect is impaired during production of bottles, and the required properties of bottles may not be satisfied. For example, a solid-state polymerized polymer for bottles which has an intrinsic viscosity of about 0.82 generally has a reduced content of cyclic trimer of about 3,000 ppm, and when a bottle is produced by injection-molding this polymer at 290° C., the content of cyclic trimer is increased to about 4,500 to 5,000 ppm during the melt molding process. This content limits applications of the bottle and lowers the productivity of the bottle.

The PET for bottles is generally produced by solid-state polymerizing a melt-polymerized prepolymer in a nitrogen atmosphere at temperatures ranging from 190 to 230° C. for about 20 hours. A primary reason therefor is that even if the solid-state polymerization time is extended, an effect of reducing the cyclic trimer is small, it is very difficult to reduce the content thereof to, for example, 2,500 ppm or less, and the intrinsic viscosity of the polymer becomes so high that the productivity of bottles decreases. This indicates that it is difficult to satisfy conflicting properties, i.e., reducing the content of the cyclic trimer by only solid-state polymerizing while the intrinsic viscosity of the polymer is kept within a range that secures excellent melt moldability.

Thus, a method of suppressing by-production of cyclic trimer during the melt-molding process has been studied, and several proposals have been made. For instance, as a method of suppressing by-production of cyclic trimer during the melt-molding process, a method comprising bringing a solid-state polymerized polymer into contact with hot water of 50 to 110° C. or water vapor of 70 to 150° C. to deactivate a polymerization catalyst (Patent Publication 1, Patent Publication 2, Patent Publication 3 and the like) is proposed. According to this method, there is little difference in the content of cyclic trimer between after solid-state polymerization and after melt-molding at 290° C., and an example in which a bottle having a cyclic trimer content of 2,800 to 3,900 ppm can be produced is disclosed.

Further, Patent Publication 4 discloses that a copolyethylene terephthalate copolymerized with 0.5 to 3.0 mol % of isophthalic acid (hereinafter may be abbreviated as "IPA") and 1.0 to 2.5 mol % of diethylene glycol (hereinafter may be abbreviated as "DEG") and having an intrinsic viscosity of 0.6 to 1.5 dl/g, a carboxyl end group concentration of not higher than 18 eq/ton and a cyclic trimer content of not higher than 0.4 wt % is a polymer which by-produces a small amount of a cyclic trimer at the time of melt-molding. As a specific example thereof (example with the smallest amount of a cyclic trimer), it is described that when a solid-state polymerized copolyethylene terephthalate copolymerized with 2.0 mol % of IPA and 2.0 mol % of DEG and having an intrinsic viscosity of 0.83 dl/g, a carboxyl end group concentration of 10.2 eq/ton and a cyclic trimer content of 0.23 wt % (2,300 ppm) was injection-molded at a cylinder temperature of 265° C., a molded article having a cyclic trimer content of 0.25 wt % (2,500 ppm) was obtained. However, this publication mentions nothing about the content of cyclic trimer when the polymer temperature is 290° C.

(Patent Publication 1) JP-A 3-47830 (the term "JP-A" as used herein means an "unexamined published Japanese patent application")
(Patent Publication 2) JP-A 8-231689
(Patent Publication 3) JP-A 6-234834
(Patent Publication 4) Japanese Patent No. 3072939

DISCLOSURE OF THE INVENTION (Object of the Invention)

The present inventor(s) has made intensive studies to develop a polyethylene terephthalate for molding which can produce a molded article having a nearly equal cyclic trimer content to that of a polymer obtained by a hot water (or water vapor) treatment, without the hot water (or water vapor) treatment of a solid-state polymerized polymer. As a result, the present inventor(s) has found that when a polyethylene terephthalate (PET) is produced by use of bis(2-hydroxyethyl)terephthalate (hereinafter may be abbreviated as "BHET") having an ion content and an acid value within specific ranges as a starting material, the desired polymer can be obtained. The present inventor(s) has found that according to the method, a PET for molding which can keep the content of cyclic trimer after solid-state polymerization to 2,000 ppm or lower and the content of cyclic trimer after melt-molding to 3,500 ppm or lower can be obtained. Further, the present inventor(s) has found that the PET for molding shows excellent bottle moldability. Based on these findings, the present invention has been completed.

Thus, an object of the present invention is to provide a method for producing a PET for molding which has a low cyclic trimer content by use of BHET having an ion content and an acid value within specific ranges as a staring material.

Another object of the present invention is to provide a PET for molding which shows (a) an intrinsic viscosity of not lower than 0.65, (b) a terminal carboxyl group concentration of not higher than 10 eq/ton and (c) a cyclic trimer content of not higher than 2,000 ppm after solid-state polymerization and (d) a cyclic trimer content of not higher than 3,500 ppm after molten and kept at 290° C. for 30 seconds.

Other objects and advantages of the present invention will become apparent from the following description.

SUMMARY OF THE INVENTION

Firstly, the present invention is a method for producing a polyethylene terephthalate for molding, comprising:
(1) a condensation step of condensing bis(2-hydroxyethyl) terephthalate having an ion content of 10 ppm or less and an acid value of 30 mgKOH/g or less to produce an oligomer having an average polymerization degree of 4 to 10,
(2) a melt-polymerization step of melt-polymerizing the oligomer to produce a prepolymer having an intrinsic viscosity of 0.50 to 0.65, and
(3) a solid-state polymerization step of crystallizing pellets of the prepolymer and then solid-state polymerizing the prepolymer at a temperature of 190 to 230° C. to produce a polyethylene terephthalate having an intrinsic viscosity of not lower than 0.65.

This production method includes, as a preferred embodiment, the solid-state polymerized polyethylene terephthalate having a carboxyl end group concentration of 10 eq/ton or less and a cyclic trimer content of 2,000 ppm or less.

The production method also includes bis(2-hydroxyethyl) terephthalate having an optical density of 0.000 to 0.010.

The production method also includes bis(2-hydroxyethyl) terephthalate having a purity of not lower than 95 wt %.

The production method also includes bis(2-hydroxyethyl) terephthalate containing 0.5 to 5 mol % of isophthalic acid based on an acid component of bis(2-hydroxyethyl)terephthalate.

The production method also includes, as a preferred embodiment, performing condensation at a pressure of 7 to 70 kPa and a temperature of 220 to 270° C. in the condensation step.

The production method also includes performing condensation in the presence of a polymerization catalyst and a stabilizer.

The production method also includes the prepolymer having a carboxyl end group concentration of 10 eq/ton or less.

The production method also includes carrying out melt polymerization eventually at a pressure of 25 to 140 Pa and a temperature of 270 to 290° C. in the melt polymerization step.

Secondly, the present invention is a polyethylene terephthalate for molding, having:
(a) an intrinsic viscosity of not lower than 0.65,
(b) a terminal carboxyl group concentration of 10 eq/ton or less,
(c) a cyclic trimer content of 2,000 ppm or less, and
(d) a cyclic trimer content after molten and kept at 290° C. for 30 seconds of 3,500 ppm or less.

This polyethylene terephthalate for molding includes, as a preferred embodiment, having a carboxyl end group concentration (b) of 6 eq/ton or less.

Further, the polyethylene terephthalate for molding includes having a cyclic trimer content (c) of 1,000 to 1,800 ppm and a cyclic trimer content after molten and kept at 290° C. for 30 seconds (d) of 2,500 to 3,500 ppm.

(Advantageous Effect of the Invention)

According to the method of the present invention, there is provided a method for producing a polyethylene terephthalate whose cyclic trimer content is low and does not become higher than a given value even after melt-molding and is therefore suitable for molding.

More specifically, according to the present invention, there is obtained a polyethylene terephthalate for molding which has (a) an intrinsic viscosity of not lower than 0.65, (b) a carboxyl end group concentration of 10 eq/ton or less, (c) a cyclic trimer content of 2,000 ppm or less, and (d) a cyclic trimer content after molten and kept at 290° C. for 30 seconds of 3,500 ppm or less.

BEST MODE FOR CARRYING OUT THE INVENTION (Starting Material)

In the method of the present invention, bis(2-hydroxyethyl)terephthalate (BHET) having (A) an ion content of 10 ppm or less and an acid value of 30 mgKOH/g or less is used as a starting material. This BHET has an ion content of preferably 5 ppm or less, particularly preferably 2 ppm or less, and an acid value of preferably 10 mgKOH/g or less, particularly preferably 4 mgKOH/g or less. Further, the BHET preferably has an optical density of 0.000 to 0.010, more preferably 0.000 to 0.006, particularly preferably 0.000 to 0.004.

Further, this BHET preferably has a purity of not lower than 95 wt %, more preferably not lower than 98 wt %. The purity of BHET is the proportion (wt %) of the BHET. Other components substantially include at least one of an oligomer (having a polymerization degree of about 2 to 10) of BHET, mono(2-hydroxyethyl)terephthalate (hereinafter may be abbreviated as "MHET"), 2-hydroxyethyl[2-(2-hydroxyethoxy)ethyl] terephthalate (hereinafter may be abbreviated as "DEG ester") and dicarboxylic acid.

For example, when a starting material is a mixture of 95 wt % of BHET and 5 wt % of terephthalic acid (hereinafter may be abbreviated as "TPA") and/or isophthalic acid (IPA), the purity is 95 wt %. In this case, when the acid value of the BHET is 0 mgKOH/g, the acid value of the staring material is about 50 mgKOH/g. Further, when a starting material is a mixture of 97 wt % of BHET, 1 wt % of DEG ester and 2 wt % of IPA, the purity is 97 wt %. In this case, when the acid value of the BHET is 0 mgKOH/g, the acid value of the staring material is about 20 mgKOH/g. The BHET preferably contains isophthalic acid in an amount of 0.5 to 5 mol %, more preferably 1 to 4 mol %, based on an acid component of the BHET.

When the ion concentration of the BHET exceeds 10 ppm, the content of cyclic trimer in a solid-state polymerized polymer becomes high, and when the acid value thereof exceeds 30 mgKOH/g, the content of cyclic trimer in the solid-state polymerized polymer becomes high undesirably. Further, when the optical density of the staring material becomes high, the color of the polymer is liable to deteriorate, and applications of the polymer may be limited. Thus, the optical density is preferably as low as possible.

BHET in the present invention is not limited by a production method thereof. BHET obtained by decomposing (depolymerizing) a waste PET, particularly crushed pieces of a collected PET bottle, with ethylene glycol (hereinafter may be abbreviated as "EG") to obtain a decomposition product solution (EG solution of decomposition product) and then subjecting this decomposition product solution to a purification treatment is preferred. In addition, BHET obtained by an esterification reaction of TPA and EG and BHET obtained by a transesterification reaction of dimethyl terephthalate (hereinafter may be abbreviated as "DMT") and EG are preferred. Of these, use of BHET obtained by decomposing (depolymerizing) a waste polyethylene terephthalate (particularly crushed pieces of a collected PET bottle) with EG to obtain a decomposition product solution (EG solution of decomposition product) and then subjecting the decomposition product solution to a purification treatment is particularly preferred.

To be more specific about the method using a waste PET, a waste PET, particularly crushed pieces of a collected PET bottle, is decomposed (depolymerized) with EG to produce a decomposition product solution (EG solution of decomposition product). Then, this decomposition product solution is subjected to a purification treatment to obtain BHET having an ion content of 10 ppm or less, an acid value of 30 mgKOH/g or less and a purity of not lower than 95 wt %. It is particularly preferred to use this BHET as a starting material.

In that case, the PET, particularly a PET used in a PET bottle (colored PET bottle or transparent PET bottle), may be produced by any method. The PET may be a homopolymer or a copolymer, e.g., a copolymer copolymerized with a small amount (for example, 10 mol % or less based on all acid components) of IPA, 1,4-cyclohexane dimethanol (hereinafter may be abbreviated as "1,4-CHDM"), 1,4-butanediol (hereinafter may be abbreviated as "BD") or the like. The optical density of the BHET is preferably not higher than 0.010, more preferably not higher than 0.006, particularly preferably not higher than 0.004. The minimum value of the optical density is 0.000.

The decomposition (depolymerization; glycolysis) reaction of the PET by use of EG can be carried out by a conventionally known method and conditions, including the methods and conditions which have been previously proposed by the present inventor(s), e.g., methods and conditions described in International Publications No. 01/10812 pamphlet and No. 02/10117 pamphlet, JP-A 2002-121173 and the like.

To carry out this decomposition reaction (depolymerization reaction) efficiently, for example, the PET is first brought into contact with a depolymerization agent (preferably a distillation residue of crude BHET) composed essentially of BHET and/or a condensate thereof (preferably an oligomer having a polymerization degree of about 2 to 10) at an elevated temperature to carry out preliminary depolymerization. Then, depolymerization (actual depolymerization) is preferably allowed to further proceed by use of excess EG to prepare a decomposition product solution containing crude BHET. This EG may be purified EG. However, it is also possible to use EG which contains a small amount of other glycol or EG which contains crude EG produced by the following crystallization and solid-liquid separation.

As for the ratio of the amount of the PET to the amount of BHET (and/or a condensate thereof) in the preliminary depolymerization, the amount of BHET (and/or a condensate thereof) is preferably 0.1 to 4.5 parts by weight, more preferably 0.1 to 2.0 parts by weight, particularly preferably 0.1 to 1.0 part by weight, per part by weight of the PET. The temperature of the preliminary depolymerization is preferably 180 to 290° C., more preferably 190 to 270° C., particularly preferably 200 to 260° C. The reaction time is preferably 0.1 to 5.0 hours, more preferably 0.3 to 1.5 hours.

The decomposition product obtained by the preliminary depolymerization preferably has a polymerization degree of about 5 to 40, more preferably 10 to 30.

The temperature of the depolymerization reaction (actual depolymerization reaction) between the preliminary depolymerization product obtained by the preliminary depolymerization and EG is preferably 190 to 265° C., more preferably 200 to 220° C. As for the ratio of the amount of the preliminary depolymerization product to the amount of EG, the amount of EG is preferably 0.5 to 8.0 parts by weight, more preferably 2.0 to 7.0 parts by weight, per part by weight of the preliminary depolymerization product. When the amount of the preliminary depolymerization product is excessively small with respect to EG, the amount of BHET to be produced becomes smaller than saturation solubility in EG, and BHET can be obtained only in a smaller amount than the maximum yield obtained with respect to the total fluid volume to be subjected to a deionization treatment, which is uneconomical. Meanwhile, when the amount of the preliminary depolymerization product is excessively large with respect to EG, an oligomer of BHET increases and the yield of BHET decreases. Further, when BHET exists beyond the saturation solubility of EG, BHET precipitates, so that the deionization treatment cannot be conducted. The depolymerization reaction time is preferably 0.5 to 5.0 hours, more preferably 0.5 to 2.0 hours. The preliminary depolymerization product obtained by the depolymerization comprises BHET as a main component and can contain a small amount (for example, 20 wt % or less, preferably 10 wt % or less based on all solutes) of an oligomer having a polymerization degree of 2 to 20, preferably 2 to 10.

Further, when EG is used as the above depolymerization agent from the beginning, the temperature of the decomposition reaction is preferably 180 to 230° C., more preferably 190 to 220° C. The ratio of the amount of the PET to the amount of EG at the time of decomposition (depolymerization) is preferably 1:9 to 3:7 in terms of weight ratio.

The above decomposition reaction (depolymerization reaction) is preferably carried out by setting a rectification column in a depolymerization reactor and distilling water out of the system from the reaction solution. In that case, it is preferable to allow evaporated EG to return into the system. By carrying out the decomposition process in this manner, the amount of water in the decomposition product solution when it is brought into contact with a cation exchanger can be rendered small, so that a hydrolysis reaction occurring with a decationization treatment can be controlled. It is preferred to adjust the amount of water contained in the EG solution to be brought into contact with the cation exchanger to 0.5 wt % or less. The amount of water can be obtained by measuring the decomposition product solution by use of KF moisture meter MKC-510N of KYOTO ELECTRONICS MANUFACTURING CO., LTD.

The decomposition product solution obtained by the decomposition process generally comprises BHET as a main solute, EG as a main solvent, and an ester of DEG which is contained in a PET as a raw material or produced by a side reaction at the time of the decomposition reaction (depolymerization reaction), as a secondary solute. Further, the decomposition product solution may contain an oligomer of BHET or MHET as other solute component and DEG liberated from the DEG component contained in the raw material PET or the DEG component produced by the side reaction at the time of the decomposition reaction as a non-solute component.

Further, the decomposition product solution may also contain a catalyst used in the decomposition reaction (depolymerization reaction) (e.g., an alkali compound such as caustic soda or caustic potash), a catalyst used in a polycondensation reaction in the polyester producing step (e.g., an antimony compound such as antimony oxide, a germanium compound such as germanium oxide or a titanium compound such as alkoxy titanium), additives such as a stabilizer (e.g., a phosphorus compound) and an antistatic agent, a colorant used in a colored bottle and the like (e.g., red iron oxide, carbon black, phthalocyanine blue or monoazo yellow), and impurity ions derived from various pollutions which are difficult to expect.

The solvent used in the above decomposition reaction may contain a small amount (preferably 10 wt % or less) of glycol other than ethylene glycol.

The above decomposition product solution is preferably a solution having a solid (solute) concentration of preferably 5 to 40 wt %, more preferably 10 to 30 wt %, particularly preferably 17 to 23 wt %. When the solid concentration of the solution obtained by the decomposition reaction (depolymerization reaction) does not satisfy this range, it is preferred that the concentration be adjusted by use of EG.

The above decomposition product solution is preferably brought into contact with activated carbon at a temperature of 50 to 100° C., preferably 70 to 90° C., in its purification treatment. By this treatment, a pigment (such as color index pigment yellow 151) having a hydrophilic group (such as a carboxyl group) may not be adsorbed and removed in some cases, but other colorants are adsorbed and removed. This activated carbon treatment is also effective in removing components which cause degradation in the performance of the ion exchanger.

The above activated carbon treatment of the decomposition product solution can be conducted by passing the decomposition product solution through a layer of activated carbon filled in a column or the like to make them contact with each other, for example. When the decomposition product solution is a suspension, a blockage occurs in the activated carbon layer and drift occurs due to insufficient flow or flow resistance non-uniformity of the solution, so that a stable decolorization treatment is difficult to conduct. Therefore, contact between activated carbon and the decomposition product solution is preferably made after solid impurities of 1 µm or larger in size, e.g., fine particles, are removed from the solution before and/or after the activated carbon treatment, as required. The temperature of the solution is preferably lower than or equal to the maximum working temperature of the ion exchange resin and is preferably a temperature at which crystals of ethylene glycol ester of dicarboxylic acid, particularly BHET, are not precipitated from the decomposition product solution.

Illustrative examples of the above activated carbon include coal-based activated carbon and wood-based activated carbon. Of these, the coal-based activated carbon (e.g., "DIAHOPE008" of Mitsubishi Chemical Corporation) is particularly preferred. Further, the shape of the activated carbon may be powdery activated carbon, granular activated carbon or fibrous activated carbon, for example. Of these activated carbons, coal-based granular activated carbon is preferred from the viewpoints of an effect of removing impurities of the present invention and strength in heating regeneration. The maximum diameter of these activated carbon (particles) is preferably about 1 to 3 mm.

The amount of the solution passing until the activated carbon undergoes breakthrough is preferably 4,700 to 19,000 parts by weight based on 100 parts by weight of the activated carbon, although varying depending on the degree of pollution of the solution. The status of the breakthrough of the activated carbon can be known by determining the relationship between the status of the breakthrough of the activated carbon and the OD value (optical density) of the decomposition product solution after the adsorption treatment in advance and measuring the OD value.

After brought into contact with the activated carbon, the above decomposition product solution is preferably brought into contact with a cation exchanger and then with an anion exchanger. The deionization treatment of the decomposition product solution can be conducted by passing the decomposition product solution through a layer of the ion exchangers filled in a column or the like to make them contact with each other, for example. When the activated carbon treatment is carried out after the ion exchange treatment, pigments and foreign matters which are supposed to be adsorbed by activated carbon are adsorbed on the surfaces of the ion exchangers, thereby lowering ion exchange efficiency disadvantageously. Further, when the decomposition product solution is brought into contact with the anion exchanger first and then with the cation exchanger, an undesirable side reaction (such as production of DEG or DEG ester) occurs in the decomposition product solution in the subsequent step. The above cation exchanger and anion exchanger may be in the form of particles, chain or fibers or may be amorphous, for example. When they are in the form of particles, the decomposition-product solution can be brought into contact with them by filling them in a column and passing the decomposition product solution through the column.

When the above decomposition product solution is a suspension, a blockage occurs in the ion exchanger layer and drift occurs due to insufficient flow or flow resistance non-uniformity of the solution composition, so that a stable decolorization treatment is difficult to conduct, as in the activated carbon treatment. Therefore, contact between the cation exchanger and the anion exchanger and the decomposition product solution is preferably made after solid impurities of 1 µm or larger in size, e.g., fine particles, are removed from the solution after the activated carbon treatment, as required. The temperature of the solution is preferably lower than or equal to the maximum working temperature of the ion exchange resin and is preferably a temperature at which crystals of ethylene glycol ester of dicarboxylic acid, particularly BHET, are not precipitated from the decomposition reaction (depolymerization reaction) solution.

Since the maximum working temperature of the cation exchanger is generally higher than that of the anion exchanger, it is preferable to cool the solution resulting from the cation exchange treatment to the maximum working temperature of the anion exchanger or lower or to carry out the cation exchange treatment and the anion exchange treatment at temperatures lower than or equal to the maximum working temperature of the anion exchanger. In general, the proportion of cations in an ion impurity is overwhelmingly higher than the proportion of anions. Further, the acidity of the decomposition product solution is lowered by the cation exchange and a side reaction occurs in the subsequent step as described below. Thus, the anion exchange treatment is preferably carried out after the cation exchange treatment.

The above decomposition product solution is preferably contacted with the cation exchanger for a residence time of 3 to 30 minutes, more preferably 3 to 15 minutes. Further, contact between the decomposition product solution and the cation exchanger is preferably made at a space velocity of 1 to 12 hr$^{-1}$, more preferably 4 to 9 hr$^{-1}$. When this residence time is less than 3 minutes, the cation exchange treatment cannot be carried out to a satisfactory extent, while when it is more than 30 minutes, DEG or water is produced by the dehydration reaction of EG. Thus, produced water promotes production of carboxyl group by the hydrolysis reaction of BHET and/or an oligomer thereof and the acid value of the reaction system increases disadvantageously. Further, a transesterification reaction between produced DEG and BHET causes the degree of conversion into DEG ester to be a permissible value or larger disadvantageously. In addition, after contacted with the cation exchanger, the decomposition product solution is preferably contacted with the anion exchanger for 3 seconds to 10 minutes, more preferably 3 seconds to 5 minutes, particularly preferably 3 seconds to 3 minutes. Thereby, the above dehydration reaction, transesterification reaction and hydrolysis reaction can be controlled.

As the above cation exchanger, a cation exchange resin is preferred, and as the above anion exchanger, an anion exchange resin is preferred. Specific examples of a cation exchange functional group in the cation exchange resin include —SO$_3$H and —COOH. Further, as the cation exchange resin, those which are commercially available as DIAION SK1B, DIAION SK104, DIAION SK110, DIAION SK112 and DIAION SK116 (products of Mitsubishi Chemical Corporation) and AMBERLITE IR120B, AMBERLITE IR120BN, AMBERLITE IR124 and AMBERLITE 200CT (products of Roam & Haas Japan) can be used, for example. In these commercial products, an ion exchange functional group is generally stabilized as a salt such as a sodium salt. Thus, the functional group is preferably converted into a free acid radical as described above in using the commercial products.

Illustrative examples of the above anion exchange resin include those having —N(CH$_3$)$_2$, —NH(C$_2$H$_4$NH)$_n$H, —N(CH$_3$)$_3$OH and the like as an anion exchange functional group. As these anion exchange resins, those which are commercially available as DIAION WA10, DIAION WA20, DIAION WA21J and DIAION WA30 (products of Mitsubishi Chemical Corporation) and AMBERLITE IRA67, AMBERLITE IRA400J, AMBERLITE IRA96SB and AMBERLITE XE583 (products of Roam & Haas Japan) can be used, for example.

Further, gel-type anion exchange resins are classified into a cracked type and an uncracked type, and the uncracked type is preferred because less BHET is adsorbed. Further, a porous material, i.e., MR type (microporous type), which is an ion exchange resin showing better physical durability and a higher exchange adsorption rate than the gel type can also be used.

The maximum working temperature of the cation exchange resin is about 120° C. in the case of a strongly acidic styrene-based cation exchange resin and about 100° C. in the case of a weakly acidic methacryl-based cation exchange resin. Meanwhile, the maximum working temperature of the anion exchange resin is about 40 to 60° C. in the case of a strongly basic quaternary-ammonium-type anion exchange resin whose exchange group is an —OH type, about 80° C. or lower in the case of a strongly basic quaternary-ammonium-type anion exchange resin whose exchange group is a —Cl type, and about 100° C. or lower in the case of a weakly basic primary to tertiary amine (—NH$_2$R, —NHR$_2$ or —NR$_3$) type anion exchange resin. Due to the above temperatures, it becomes preferable that the decomposition product solution be cooled to a temperature of 40 to 60° C. and then subjected to the anion exchange treatment after subjected to the cation exchange treatment at a temperature of 120° C. or lower. When BHET is precipitated by a decrease in the saturation solubility of BHET caused by a decrease in the temperature, a proper amount of EG of desired temperature should be added. From an economical standpoint, it is preferable that the anion exchange treatment be carried out by use of a primary to tertiary amine type anion exchange resin after the cation exchange treatment is carried out at a temperature of 50 to 100° C., more preferably 60 to 95° C., much more preferably 70 to 90° C. In that case, the primary to tertiary amine type anion exchange resin is preferably used in admixture with a cation exchange resin (preferably a strongly acidic cation exchange resin) since the anion exchange resin is dissociated in a neutral or acidic (preferably acidic) state and has an ion exchange capability. The mixing ratio (volume ratio) of the above anion exchange resin to the above strongly acidic cation exchange resin is preferably 1:3 to 5:1, more preferably 1:2 to 3:1.

Illustrative examples of cations in the decomposition reaction product solution include Na$^+$ and K$^+$ derived from the above decomposition reaction (depolymerization reaction) catalyst and Ca$^{2+}$, Mg$^{2+}$, Mn$^{2+}$, Co$^{2+}$, Zn$^{2+}$, Sb$^{3+}$, Ge$^{2+}$ and Ti$^{4+}$ derived from a catalyst or property imparting agent used in the polycondensation reaction in the polyester producing step. On the other hand, illustrative examples of anions in the decomposition reaction product solution include PO$_4^{3-}$ derived from a stabilizer and SO$_4^{2-}$ and Cl$^-$ which are ions adhered to the polyethylene terephthalate. Since the amount of the cations is significantly larger than that of the anions, it is preferable to carry out the anion exchange treatment after the cation exchange treatment.

Hydrogen ions are produced by the above cation exchange reaction, and the treated solution shows being acidic. The produced hydrogen ions promote the dehydration reaction of EG to produce DEG and water and promote the transesterification reaction between BHET produced by decomposition (depolymerization) of the PET and DEG to by-produce DEG ester. Further, when the treated solution contains a large quantity of water, BHET undergoes hydrolysis to produce MHET. Further, these reactions are further promoted when the solution is treated at high temperatures ranging from, for example, 80° C. to 90° C. as compared with when the solution is treated at room temperature. Accordingly, the time between completion of the cation exchange treatment and start of the anion exchange treatment is preferably as short as possible. As described above, the time is preferably 3 seconds to 10 minutes, more preferably 3 seconds to 5 minutes, particularly preferably 3 seconds to 3 minutes.

To control the transesterification reaction and hydrolysis reaction of BHET, a method comprising neutralizing hydrogen ions by adding an alkali is conceived. However, in this case, new cations derived from the alkali are brought to the system, thereby negating the previously conducted cation removing treatment undesirably.

To control the transesterification reaction in the above cation exchange treatment process, the residence time of the cation exchange treatment is preferably shortened. While the ion exchange rate increases as the temperature at which the ion exchange treatment is carried out increases, the transesterification reaction rate also increases. For this reason, the residence time is shortened such that the degree of conversion of the decomposition product by the transesterification reaction becomes a permissible value or smaller.

In the above purification treatment, the transesterification reaction and hydrolysis reaction of the decomposition product obtained by decomposing the PET with EG are controlled by carrying out the anion exchange treatment as quickly as possible after the cation exchange treatment. Hydroxide ions are produced by the anion exchange treatment and undergo a neutralization reaction with hydrogen ions, whereby the hydrogen ions in the reaction solution can be reduced.

The ion content of the decomposition product solution after undergoing the ion exchange treatment is preferably 0.2 to 0.6 µS/cm, more preferably 0.2 to 0.5 µS/cm, in terms of electric conductivity. Further, the pH of the solution is preferably 2.5 to 7.0, particularly preferably 3.0 to 5.0. To render the electric conductivity lower than 0.2 µS/cm, the ion exchange treatment time must be increased, thereby increasing the side reaction and making the pH smaller than 2.5, i.e., becoming closer to the acidic side undesirably. Meanwhile, when the electric conductivity is higher than 0.6 µS/cm, the growth of precipitated particles in the crystallization treatment is inhibited, resulting in small precipitated particles, and a decrease in yield in filtration and deterioration in quality by remaining impurities occur undesirably. The electric conductivity can be measured by applying electric conductivity meter 873CC of FOXBORO CORPORATION to the sample.

The decomposition product solution after undergoing the activated carbon treatment and the ion exchange treatment is preferably cooled to 15 to 30° C. to carry out separation by crystallization of BHET as a solute and remove a side reaction product and a coloring material which are soluble in the EG solvent. A known evaporation distillation treatment is preferably carried out thereafter to obtain high-purity BHET. It is conceived that in general, removal of a colorant and a coloring material which could not be removed by the above pretreatment does not always require the crystallization treatment and can be achieved by carrying out the evaporation distillation treatment. However, when the colorant has sublimability or when the coloring material produced in the pretreatment step is to be prevented from entering the distillation treatment step, separation by crystallization is effective. In this crystallization treatment, the size of precipitated BHET is preferably 20 to 300 µm, more preferably 40 to 200 µm in terms of average particle diameter, and the precipitate is preferably solid-liquid separated by solid-liquid separation means, preferably filtration equipment. This average particle diameter can be determined by measuring in a 10-fold dilution by use of SALD-200VER of Shimadzu Corporation. Evaporation and distillation of BHET are preferably carried out by a simple distillation treatment or molecular distillation treatment. For example, molecular distillation of BHET is preferably carried out at a pressure of 25 Pa or lower, more preferably 15 Pa or lower, and a temperature of 180 to 220° C., more preferably 185 to 205° C. By the molecular distillation, purified BHET with a purity of 95 wt % or higher or even 98 wt % or higher can be obtained industrially advantageously.

When a waste PET, particularly a PET bottle, is used as a starting material in production of the above BHET, it is very useful as an eco-friendly technology which makes chemical recycling of the waste PET possible. Further, in some cases, as BHET, a product obtained from an esterification reaction between TPA and EG or a product obtained from a transesterification reaction between DMT and EG can be used. These reaction products can be purified by the above purification method as desired. Further, they can be purified by a method described in the pamphlet of International Publication No. 01/10812.

BHET in the present invention, i.e., BHET having an ion content of 10 ppm or less and an acid value of 30 mgKOH/g or less is first condensed (oligomerized) to produce an oligomer having an average polymerization degree of 4 to 10, the oligomer is then melt-polymerized to produce a prepolymer having an intrinsic viscosity of 0.50 to 0.65, and the prepolymer is then solid-state polymerized to produce a polymer having an intrinsic viscosity of not lower than 0.65.

In that case, BHET as a starting material is preferably of single composition. However, it may contain a small amount of a third component, e.g., a dicarboxylic acid such as adipic acid, sebacic acid or IPA, a glycol such as 1,4-CHDM or BD, or the like, to adjust crystallinity and the like. The amount of the third component varies according to the design of the properties of the final polymer. In the case of a dicarboxylic acid, the amount of the dicarboxylic acid is preferably such that the acid value of the whole starting material does not exceed 30 mgKOH/g. The amount of the dicarboxylic acid is more preferably 0.5 to 5 mol %, particularly preferably 0.5 to 3 mol %, based on the acid component of BHET. Meanwhile, in the case of a glycol, the amount of the glycol is preferably 0.5 to 5 mol %, particularly preferably 0.5 to 3 mol %, based on the glycol component of BHET.

In the stage of the above oligomerization reaction and melt-polymerization reaction, a reaction which produces DEG generally occurs as a side reaction. However, when the content of the DEG component in the PET is high, the properties of the polymer deteriorate. Thus, this content must be made low.

Byproduction of DEG in the above reaction step is a reaction in which a terminal hydroxyethyl ester group and free EG in the reaction system are involved. Since these terminal groups exist in the reaction system in a large amount in the initial stage of the reaction, the increase rate of DEG is the highest at the start of the reaction. This indicates that the present invention using BHET as a starting material is in a more difficult situation than the conventional method. Further, since DEG has reactivity close to that of EG, is easily copolymerized and has a boiling point (about 245° C.) higher than the boiling point (about 198° C.) of EG, it is not easy to remove DEG from the reaction system by distillation.

In the study made by the present inventor, it has been found that to reduce the content of DEG in the PET, it is more effective to remove EG from the system quickly so as to prevent production of DEG than to remove produced DEG. That is, to control byproduction of DEG by a direct or indirect reaction between the terminal hydroxyethyl ester group and EG, it is effective to remove free EG from the system as quickly as possible in the oligomerization reaction stage. It has been found that the content of the DEG component in the produced polymer can be reduced by removing EG from the system quickly. Further, it has also been found that to further enhance the effect, it is effective to remove EG quickly by heating EG not at normal pressure but under reduced pressure, since EG has a high boiling point as described above. Further, it has been found that in that case, it is important to prevent EG from refluxing or remaining in the reaction system. Further, control of byproduction of DEG also controls byproduction of water, so that hydrolysis of BHET and the produced oligomer can be reduced, production of carboxyl groups can be inhibited and the acid value of the reaction system can be made small. The small acid value gives an effect of controlling byproduction of cyclic trimer. The oligomerization reaction and the melt-polymerization reaction in the present invention must be carried out in consideration of the above side reaction.

(Condensation Step)

Therefore, in the present invention, oligomerization of BHET is carried out by placing BHET in an oligomerization reactor and condensing BHET preferably in the presence of a polymerization catalyst under a reduced pressure of 7 to 70 kPa, preferably 10 to 30 kPa at an elevated temperature of 220 to 270° C. while evaporating EG from the reactor to produce an oligomer having an average polymerization degree of 4 to 10. In that case, it is preferable to prevent reflux of EG by heating the upper portion of the reactor and an EG distillation tube at the same temperature as that of the inside of the reactor. When the above pressure is lower than 7 kPa, bumping of the content of the reactor occurs, while when it is higher than 70 kPa, the oligomerization takes a long time, resulting in an increase in the amount of DEG. Further, when the above temperature is lower than 220° C., the oligomerization reaction takes a long time, resulting in an increase in the amount of DEG undesirably. The condensation reaction of the oligomerization is preferably carried out in 30 to 90 minutes.

The above condensation reaction is preferably carried out in the presence of a polymerization catalyst and a stabilizer. As this polymerization catalyst, a known polymerization catalyst, e.g., antimony compounds such as antimony trioxide and antimony acetate or germanium compounds such as germanium dioxide, can be preferably used. The catalyst may be dissolved in EG and added in the form of a solution or may be dispersed in EG and added in the form of a dispersion. In that case, the concentration of the catalyst is preferably 0.1 to 20 wt %, more preferably 0.5 to 10 wt %. The condensation reaction can be started after heating without distilling out EG so as to cause the polymerization catalyst to exert its function quickly by alcoholation of the polymerization catalyst. The heating time is preferably 10 to 60 minutes, more preferably 20 to 60 minutes, particularly preferably 30 to 60 minutes. The temperature is preferably 130 to 260° C., more preferably 140 to 220° C., particularly preferably 150 to 200° C.

Meanwhile, as the stabilizer, phosphorus compounds such as phosphoric acid, phosphorous acid, dimethyl phosphate, dimethyl phosphate, trimethyl phosphate, trimethyl phosphite, triphenyl phosphate and triphenyl phosphite, and amine compounds such as tertiary amines, e.g., trimethylamine, tri-n-butylamine and benzylmethylamine and quaternary ammonium hydroxides, e.g., tetraethylammonium hydroxide, tetra-n-butylammonium hydroxide and trimethylbenzylammonium hydroxide, are preferably used. The amount of the polymerization catalyst may be a known amount. For example, in the case of the antimony compound, its amount is preferably 100 to 300 ppm, more preferably 150 to 250 ppm, in terms of antimony element content, and in the case of the germanium compound, its amount is preferably 50 to 200 ppm, more preferably 80 to 160 ppm, in terms of germanium element content. Meanwhile, as to the amount of the stabilizer, it is preferably 20 to 40 ppm in terms of phosphorus element content in the case of the phosphorus compound, and it is preferably 1 to 100 ppm in terms of nitrogen element content in the case of the amine compound.

(Melt-Polymerization Step)

Then, to obtain a prepolymer of desired polymerization degree, the internal pressure of the system is decreased and the internal temperature of the system is increased to carry out a polycondensation reaction of the above oligomer. This reaction is generally carried out in a melt-polymerizer which further increases the polymerization degree of the oligomer. Further, the reaction to obtain the prepolymer may be carried out in a batch style in which the oligomer and the prepolymer are produced sequentially in the same reactor. For example, when the pressure is reduced to 25 to 140 Pa and the temperature is increased to 270 to 290° C., preferably 272 to 285° C., a PET (prepolymer) having an intrinsic viscosity (mixed solvent of phenol/tetrachloroethane (1/1), 25° C.) of 0.50 to 0.65, especially 0.52 to 0.63, can be formed. The carboxyl end group concentration of the prepolymer is preferably 10 eq/ton or less, more preferably 6 eq/ton or less.

(Solid-State Polymerization)

The thus obtained prepolymer is cooled to be solidified into pellets having an average particle diameter of 1 to 5 mm. After predried as desired, the pellets are crystallized to a specific gravity of 1.38 or higher. Then, the crystallized pellets are solid-state polymerized at a temperature of 190 to 230° C. so as to obtain a PET having an intrinsic viscosity of not lower than 0.65.

The above predrying of the prepolymer is preferably carried out by heating the prepolymer at 60 to 100° C. for 4 to 12 hours. The above crystallization of the prepolymer is preferably carried out by heating the pellets to a temperature of 140 to 165° C. in 5 to 10 minutes in a nitrogen atmosphere and then keeping the pellets under heating at 135 to 165° C. for 5 to 15 hours. Since this crystallization treatment exhibits an effect of drying the pellets, the water content of the pellets after the crystallization treatment is very low (generally 0.1 wt % or lower). Thus, the crystallized pellets can be directly subjected to solid-state polymerization. When the water content of the crystallized pellets is high, the pellets are dried preferably in an inert gas atmosphere at a temperature of 120 to 170° C. over 3.5 to 7.0 hours before the solid-state polymerization. After undergoing the above crystallization and drying treatments, the prepolymer pellets are solid-state polymerized preferably in an inert gas atmosphere or under vacuum at a temperature of 190 to 230° C.

As a result, a polymer (solid-state polymerized polymer) having an intrinsic viscosity of not lower than 0.65, a carboxyl end group concentration of 10 eq/ton or less and a cyclic trimer content of 2,000 ppm or less is obtained. This polymer (solid-state polymerized PET) preferably has an intrinsic viscosity of 0.65 to 0.85, a terminal carboxyl group concentration of 6 eq/ton or less and a cyclic trimer content of 1,000 to 1,800 ppm. The DEG content of the solid-state polymerized polymer is preferably 3 mol % or lower, more preferably 1 to 3 mol %.

Further, the solid-state polymerized polymer in the present invention has a cyclic trimer content after molten and kept at 290° C. for 30 seconds of 3,500 ppm or less, preferably 2,500 to 3,500 ppm. Further, when the solid-state polymerized polymer is brought into contact with hot water or water vapor of 50 to 150° C. to deactivate the polymerization catalyst, an increase in the cyclic trimer content when molten and kept at 290° C. for 30 seconds can be 300 ppm or less. In that case, the time during which the polymer is in contact with the hot water or water vapor is preferably 0.1 to 16 hours, more preferably 0.5 to 8 hours.

Thus, according to the present invention, there can be provided a polymer for molding which is a solid-state polymerized polyethylene terephthalate having:

(a) an intrinsic viscosity of not lower than 0.65,
(b) a terminal carboxyl group concentration of 10 eq/ton or less,
(c) a cyclic trimer content of 2,000 ppm or less, and
(d) a cyclic trimer content after molten and kept at 290° C. for 30 seconds of 3,500 ppm or less, particularly 2,500 to 3,500 ppm. Further, a polyethylene terephthalate for molding which has been subjected to the above hot water or water vapor treatment after solid-state polymerization and shows an increase in the cyclic trimer content when molten and kept at 290° C. for 30 seconds of 300 ppm or less can also be provided.

Properties in the present specification were measured in the following manner.

(1) Purity of Bis(2-hydroxyethyl)terephthalate 50 mg of sample was weighed precisely, about 100 ppm of solution was prepared by use of chloroform, and the solution was analyzed by liquid chromatography (LC-6A of Shimadzu Corporation) to determine the amount of a monomer.

(2) Concentration of Carboxyl End Group 0.3 g of sample was dissolved in 30 ml of benzyl alcohol under heating and then cooled. To the resulting solution, 20 ml of chloroform was added to dilute the solution. Then, by use of phenol red as an indicator, titration was carried out by a 0.01N-potassium hydroxide solution to measure the concentration of carboxyl end group.

(3) Acid Value

This was measured by a neutralization titration method conforming to JIS K0070.

(4) Optical Density 5 g of sample was dissolved in methanol so as to prepare a 10 wt % methanol solution. The absorbance at 380 nm of this solution was measured by means of UVmini 1240 (product of Shimadzu Corporation) with a cell length of 10 mm and blanks zero-point corrected by use of methanol.

(5) Ion Content

The cation content was measured by use of SPS4000 of Seiko Denshi Kougyo Co., Ltd. in accordance with inductively coupled plasma emission spectrometry (ICP-AES), and the anion content was measured by use of IC7000S of Yokogawa Electric Corporation and DX-300 of DIONEX CO., LTD. in accordance with ion chromatography.

(6) Average Polymerization Degree and Amount of Oligomer 5 mg of sample was weighed precisely, about 100 ppm of solution was prepared by use of chloroform, and the solution was analyzed by liquid chromatography (LC-6A of Shimadzu Corporation) to determine the amount of an oligomer differing in the degree of polymerization.

(7) Intrinsic Viscosity of Polymer

A mixed solvent of phenol/tetrachloroethane (1/1) was used, a sample was added to a concentration of 0.4 g/100 ml, and the intrinsic viscosity of the polymer was determined at 25° C.

(8) Content of Diethylene Glycol

The content of diethylene glycol was measured by liquid chromatography as in the above analysis of oligomer.

(9) Color of Polymer

The L, a and b of a polymer were measured by use of colorimeter NZ-Σ80 of NIHON DENSHI KOGYO in accordance with a color hunter method.

EXAMPLES

Hereinafter, the present invention will be further described with reference to examples.

Example 1

(Condensation Step)

64.9 kg of High-Purity bis(2-hydroxyethyl)terephthalate (BHET) having an acid value of 0.9 mgKOH/g, an optical density of 0.002, an ion content of 0.5 ppm and a purity of 99.0 wt % and 0.9 kg of isophthalic acid (IPA) were mixed together to prepare BHET (acid value: 9.1 mgKOH/g, optical density: 0.002, ion content: 0.6 ppm, purity: 97.6 wt %) as a starting material and then charged into a reactor. Further, 12.0 g of antimony trioxide, 2.1 g of cobalt acetate and 6.8 g of trimethyl phosphate were also charged into the reactor. The inside of the system was substituted with nitrogen, the pressure inside the system was reduced to 15 kPa by a vacuum pump, the internal temperature was increased from 120° C. to 235° C. over 25 minutes, and an oligomer was produced over 60 minutes while by-produced ethylene glycol (EG) was distilled out. The average polymerization degree of the obtained oligomer was about 5.

(Melt-Polymerization Step)

Then, the oligomer was transferred to a polymerizer, and initial polymerization was carried out by increasing the internal temperature from 235° C. to 270° C. over 75 minutes and reducing the internal pressure to 40 kPa over 13 minutes, then to 100 Pa over 50 minutes and then to 40 Pa or lower over 12 minutes. Then, the internal temperature was raised to 273° C., and final polymerization was carried out for 70 minutes while the internal pressure was kept at 40 Pa or lower, thereby obtaining a polyethylene terephthalate (PET) having an intrinsic viscosity of 0.54.

(Solid-State Polymerization Step)

The obtained PET (prepolymer) was pelletized, kept in a nitrogen atmosphere at 135° C. for 10 hours to be crystallized and then charged into a rotary solid-state polymerizer, and solid-state polymerization was carried out under a vacuum of 40 Pa at 220° C. for 36 hours while the pellets were gradually rotated. The polymer resulting from solid-state polymerization had an intrinsic viscosity of 0.79, a carboxyl end group concentration of 0.3 eq/ton, a diethylene glycol (DEG) content of 1.9 mol %, a polymer color (b value) of 0.7, and a cyclic trimer content of 1,630 ppm.

This polymer was injection-molded into a plate at a melt temperature of 290° C. for a residence time of 30 seconds by use of an injection molding machine (Nissei Plastic Industrial Co., Ltd.: FN-1000-12A). The obtained molded plate had a polymer intrinsic viscosity of 0.76, a carboxyl end group concentration of 12.0 eq/ton, and a cyclic trimer content of 2,730 ppm. Thereby, it was revealed that this solid-state polymer was at such a level that it could be used for a heat-resistant PET bottle.

Comparative Example 1

(Condensation Step)

45.4 kg of high-purity BHET used in Example 1, 12.7 kg of terephthalic acid (TPA) and 0.9 kg of IPA were mixed together to prepare BHET (acid value: 156 mgKOH/g, optical density: 0.005, ion content: 1.5 ppm, purity: 76.2 wt %) as a starting material and then charged into a reactor.

Further, 12.0 g of antimony trioxide, 2.1 g of cobalt acetate and 6.8 g of trimethyl phosphate were charged into the reactor, the inside of the system was substituted with nitrogen, and an esterification reaction (oligomerization reaction) was carried out at normal pressure and a jacket temperature of 260° C. for 60 minutes while by-produced water was distilled out. The average polymerization degree of the obtained oligomer was about 5.

(Melt-Polymerization Step)

Then, the oligomer was transferred to a polymerizer, and initial polymerization was carried out by increasing the internal temperature from 235° C. to 270° C. over 75 minutes and reducing the internal pressure to 40 kPa over 13 minutes, then to 100 Pa over 50 minutes and then to 40 Pa or lower over 12 minutes. Then, the internal temperature was raised to 273° C., and final polymerization was carried out for 70 minutes while the internal pressure was kept at 40 Pa or lower, thereby obtaining a PET having an intrinsic viscosity of 0.59.

(Solid-State Polymerization Step)

The obtained PET (prepolymer) was pelletized, kept in a nitrogen atmosphere at 135° C. for 10 hours to be crystallized and then charged into a rotary solid-state polymerizer, and solid-state polymerization was carried out under a vacuum of 40 Pa at 215° C. for 20 hours while the pellets were gradually rotated. The polymer resulting from solid-state polymerization had an intrinsic viscosity of 0.82, a carboxyl end group concentration of 24.3 eq/ton, a DEG content of 2.5 mol %, a polymer color (b value) of 0.9, and a cyclic trimer content of 3,810 ppm.

By use of the obtained solid-state polymer, molding was carried out at 290° C. under the conditions of Example 1. The obtained molded plate had a polymer intrinsic viscosity of 0.79, a carboxyl group concentration of 29.7 eq/ton, and a cyclic trimer content of 4,090 ppm. Thereby, it was revealed that this solid-state polymer was at such a level that it could not be used for a heat-resistant PET bottle.

Comparative Example 2

(Condensation Step)

A mixture of 43.3 kg of TPA and 23.8 kg of EG was fed to an esterification tank having 1.0 kg of BHET charged therein in advance and kept at a temperature of 250° C. sequentially over 4 hours. After completion of feeding, an esterification reaction (oligomerization reaction) was allowed to proceed to an esterification rate of 97% over 1 hour.

(Melt-Polymerization Step)

Then, the reactants were transferred to a melt-polymerizer, 12.0 g of antimony trioxide, 2.1 g of cobalt acetate and 6.8 g of trimethyl phosphate were added, initial polymerization (melt polymerization) was carried out at 275° C. under a reduced pressure of 2 kPa for 1 hour, and final polymerization (melt polymerization) was carried out at 277° C. under a reduced pressure of 50 Pa for 2 hours to obtain a PET having an intrinsic viscosity of 0.58.

(Solid-State Polymerization Step)

The obtained PET (prepolymer) was pelletized, kept in a nitrogen atmosphere at 135° C. for 10 hours to be crystallized and then charged into a rotary solid-state polymerizer, and solid-state polymerization was carried out under a vacuum of 40 Pa at 215° C. for 22 hours while the pellets were gradually rotated. The polymer resulting from solid-state polymerization had an intrinsic viscosity of 0.83, a carboxyl end group concentration of 24.0 eq/ton, a DEG content of 2.4 mol %, a polymer color (b value) of −0.9, and a cyclic trimer content of 4,070 ppm.

By use of the obtained solid-state polymer, molding was carried out at 290° C. under the conditions of Example 1. The obtained molded plate had a polymer intrinsic viscosity of 0.80, a carboxyl group concentration of 26.1 eq/ton, and a cyclic trimer content of 4,350 ppm. Thereby, it was revealed that this solid-state polymer was at such a level that it could not be used for a heat-resistant PET bottle.

INDUSTRIAL APPLICABILITY

The present invention is useful in the industry which produces and uses a polyethylene terephthalate to be molded which has a low cyclic trimer content, particularly a polyethylene terephthalate for a heat-resistant bottle. Further, when a waste polyethylene terephthalate, especially bis (2-hydroxyethyl) terephthalate obtained by chemical recycling of PET bottles, is used as a starting material, PET-to-PET recycling can be achieved and is useful in future industries as an environment-friendly technology.

The invention claimed is:

1. A method for producing a polyethylene terephthalate for molding, comprising:
   (1) a condensation step of condensing bis(2-hydroxyethyl)terephthalate having an ion content of 10 ppm or less and an acid value of 30 mgKOH/g or less to produce an oligomer having an average polymerization degree of 4 to 10,
   (2) a melt-polymerization step of melt-polymerizing the oligomer to produce a prepolymer having an intrinsic viscosity of 0.50 to 0.65, and
   (3) a solid-state polymerization step of crystallizing pellets of the prepolymer and then solid-state polymerizing the prepolymer at a temperature of 190 to 230° C. to produce a polyethylene terephthalate having an intrinsic viscosity of not lower than 0.65 and having a cyclic trimer content of 2,000 ppm or less.

2. The method of claim 1, wherein the polyethylene terephthalate obtained by solid-state polymerization has a carboxyl end group concentration of 10 eq/ton or less.

3. The method of claim 1, wherein the optical density of bis(2-hydroxyethyl)terephthalate is 0.000 to 0.010.

4. The method of claim 1, wherein the purity of bis(2-hydroxyethyl)terephthalate is not lower than 95 wt %.

5. The method of claim 1, wherein bis(2-hydroxyethyl) terephthalate contains 0.5 to 5 mol % of isophthalic acid based on an acid component of bis(2-hydroxyethyl)terephthalate.

6. The method of claim 1, wherein in the condensation step, condensation is performed at a pressure of 7 to 70 kPa and a temperature of 220 to 270° C.

7. The method of claim 1, wherein in the condensation step, condensation is performed in the presence of a polymerization catalyst and a stabilizer.

8. The method of claim 1, wherein the carboxyl end group concentration of the prepolymer is 10 eq/ton or less.

9. The method of claim 1, wherein in the melt-polymerization step, melt polymerization is carried out eventually at a pressure of 25 to 140 Pa and a temperature of 270 to 290° C.

10. A polyethylene terephthalate for molding, having:
    (a) an intrinsic viscosity of not lower than 0.65,
    (b) a carboxyl end group concentration of 10 eq/ton or less, (c) a cyclic trimer content of 2,000 ppm or less, and (d) a cyclic trimer content after molten and kept at 290° C. for 30 seconds of 3,500 ppm or less.

11. The polyethylene terephthalate of claim 10, wherein the carboxyl end group concentration (b) is 6 eq/ton or less.

12. The polyethylene terephthalate of claim 10, wherein the cyclic trimer content (c) is 1,000 to 1,800 ppm, and the cyclic trimer content after molten and kept at 290° C. for 30 seconds (d) is 2,500 to 3,500 ppm.

* * * * *